United States Patent
Koshimichi

(10) Patent No.: US 7,344,181 B2
(45) Date of Patent: Mar. 18, 2008

(54) STRUCTURE FOR ATTACHING WEATHER STRIP MOLDED PART

(75) Inventor: Masaru Koshimichi, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 11/600,421

(22) Filed: Nov. 16, 2006

(65) Prior Publication Data

US 2007/0187988 A1    Aug. 16, 2007

(30) Foreign Application Priority Data

Feb. 16, 2006    (JP)    ............... 2006-039330

(51) Int. Cl.
 *B60J 10/08* (2006.01)
(52) U.S. Cl. .................................. 296/146.9
(58) Field of Classification Search ............ 296/146.9; 49/475.1, 476, 479.1, 482.1, 484.1, 489.1, 49/490.1, 493.1, 495.1, 498.1, 499.1
See application file for complete search history.

(56) References Cited

FOREIGN PATENT DOCUMENTS

JP    2005-255031    9/2005

*Primary Examiner*—Joseph D Pape
(74) *Attorney, Agent, or Firm*—Flynn, Thiel, Boutell & Tanis, P.C.

(57) ABSTRACT

A structure for attaching a weather strip for vehicle door sashes comprises a molded part having a sealing portion making elastic contact with a door opening edge of a body of a vehicle and providing sealing between the door and the body when the door is closed, and a base integrally molded with the sealing portion by attaching the molded part to the door panel using a locking screw screwed in a nut secured in the outside molding through the door panel. The base has an integrally molded eyelet-shaped resin insert having a low frictional coefficient for inserting a locking screw, and the resin insert has an annular groove at the flange that makes contact with the locking screw head in a smaller area, reducing frictional drag. The structure prevents the base from being twisted while the locking screw is screwed in, which otherwise impairs the appearance of the molded part.

3 Claims, 3 Drawing Sheets

Fig.1 [Prior art]
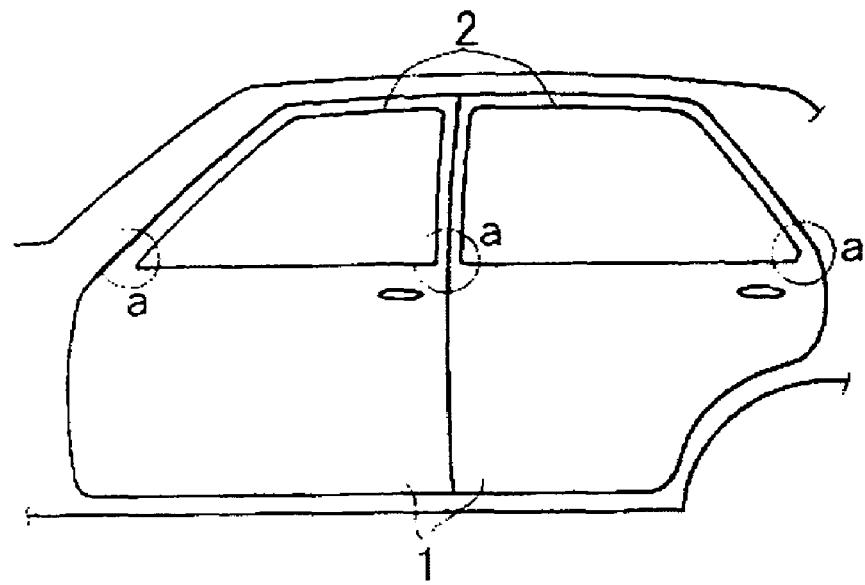
Fig.2 [Prior art]
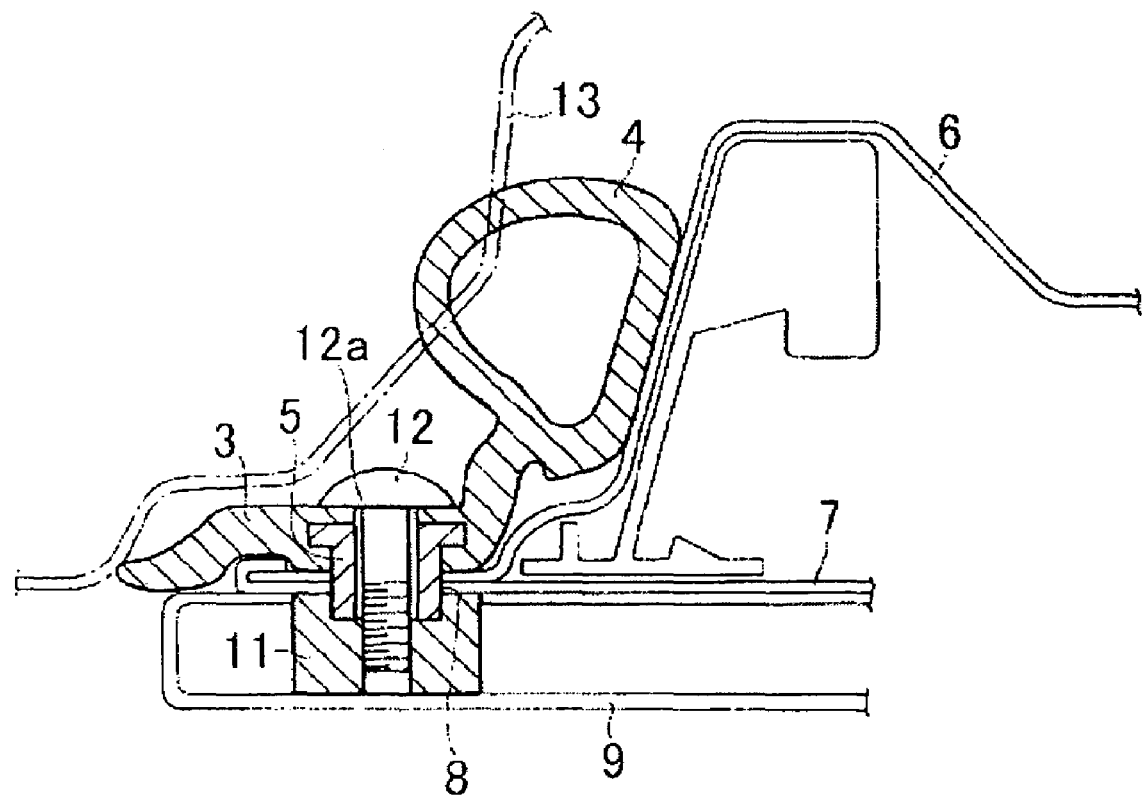

Fig.3 [Prior art]
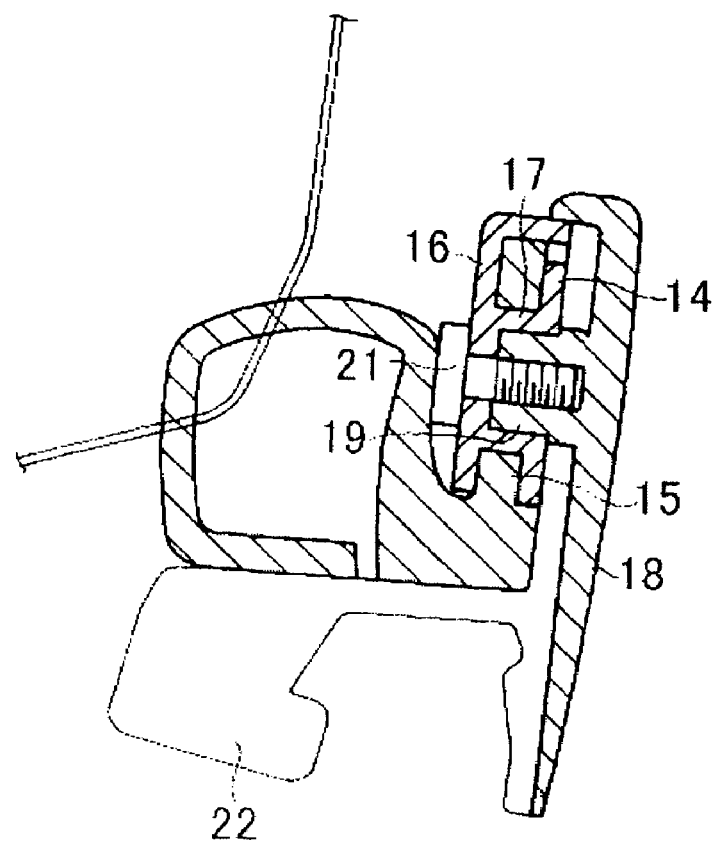
Fig.4 [Prior art]
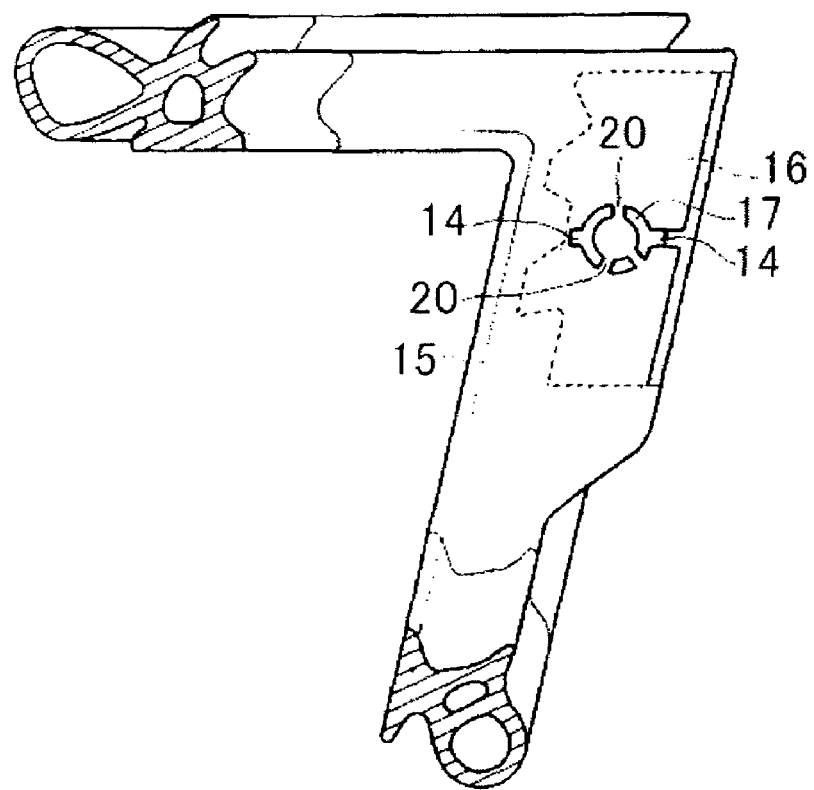

STRUCTURE FOR ATTACHING WEATHER STRIP MOLDED PART

CROSS-REFERENCE TO THE RELATED ART

This application incorporates by reference the subject matter of Application No. 2006-39330, filed in Japan on Feb. 16, 2006, on which a priority claim is based under 35 U.S.C. §119(a).

FIELD OF THE INVENTION

The present invention relates to a structure for attaching the molded part of a weather strip to a vehicle door.

BACKGROUND OF THE INVENTION

For example, referring to a vehicle shown in FIG. 1, weather strips are attached to front and rear doors 1 at the sash 2 above the belt line BL for providing sealing between the door and the body. The weather strip comprises a molded part attached to a door panel at the belt line end positions a and an extruded part constituting the rest. The extruded part comprises a base that is attached to a retainer secured to the sash and a hollow sealing portion that is integrally molded with the base and makes elastic contact with a door opening edge of the body when the door is closed. The molded part comprises, as shown in FIG. 2, a base 3 that is joined to the base of the extruded part and a hollow sealing portion 4 that is integrally molded with the base and joined to the hollow sealing portion of the extruded part.

The molded part described above is typically attached to a door panel at the end of outside molding attached to the belt line. Conventionally, a clip protruding from a resin insert integrally molded with the base is fitted in a fit-in hole formed in inner and outer door panels constituting a door panel at their overlapped portion. In a known method, as shown in FIG. 2, an eyelet-shaped resin insert 5 integrally molded with the base 3 is fitted in a mounting member 11 secured in an outside molding 9 through a fit-in hole 8 formed in inner and outer door panels 6 and 7 at the overlapped portion. Then, a locking screw 12 is screwed in the mounting member 11 through the base 3 and the insert. In the figure, the number 13 indicates a door opening edge of the body.

In another known structure for attaching the molded part, as shown in FIGS. 3 and 4, engaging grooves 20 are formed along the circumference of an annular engaging member 17 integrally molded with a resin plate 16 provided to a base 15 of the molded part and an engaging piece 14 clamping the base 15 together with the plate 16 is provided. Protrusions (not shown) that are engaged with and locked in the engaging grooves 20 are formed on a boss 19 integrally molded with a garnish 18 attached to a sash 22 at positions corresponding to the engaging grooves 20. The plate 16 is pressed on the base 15 of the molded part and the protrusions on the boss 19 of the garnish 18 are engaged with the engaging grooves 20 so that the boss 19 is fitted in the engaging member 17. Then, a locking screw 21 is inserted in the plate 16 from the side opposite to the garnish 18 and screwed in and secured to the garnish 18 (the Japanese Laid-Open Patent Application Publication No. 2005-255031).

Referring to the structure for attaching the molded part as shown in FIG. 2, the base 3 of the molded part is secured by the locking screw 12, providing highly secure attachment and the molded part does not easily come off the door panel compared to the clip attachment. On the other hand, when the locking screw 12 is screwed in and tightened, the base 3 tends to rotate together with it, becoming twisted due to frictional drag caused by the locking screw head 12a, impairing the appearance of the attached molded part. In this respect, in the attachment structure shown in FIGS. 3 and 4, the protrusions on the boss 19 are engaged with the engaging grooves 20 so that the garnish 18 does not allow the plate 16 to rotate. Therefore, the plate 16 does not rotate together with the locking screw 21 as it is screwed in and the molded part is not twisted.

The present invention provides a structure for attaching the molded part of a weather strip that facilitates the attachment of the molded part to a door, a trunk lid, or a vehicle body using a locking screw without impairing the appearance of the molded part.

SUMMARY OF THE INVENTION

The present invention relates to a structure for attaching the molded part of a weather strip to a vehicle door. The molded part comprises a base and a sealing portion that is integrally molded with the base and provides sealing between a door and the body when the door is closed. The base is secured to the door using a locking screw that is screwed in a member firmly fixed to the door through a mounting hole of an insert formed in the base. Furthermore, on the mounting hole edge where the base makes contact with the locking screw, the base has an integrally molded insert having a lower friction coefficient than the base. The insert also has a recess at a position where the screw head makes contact when attached using a locking screw.

The present invention will become more fully understood from the detailed description given below, and the accompanying drawings are given by way of illustration only, and thus, are not limitative of the present invention.

BRIEF DESCRIPTION OF THE DRAWINGS

FIG. 1 is a side view of a vehicle.
FIG. 2 is a cross-sectional view of a prior art structure for attaching the molded part.
FIG. 3 is a cross-sectional view of another prior art structure for attaching the molded part.
FIG. 4 is an illustration showing a prior art weather strip molded part provided with a plate.

DESCRIPTION OF THE PREFERRED EMBODIMENT

An embodiment of the structure for attaching the molded part according to the present invention is described hereafter with reference to the drawings. In the figure, the same reference numbers as those of the attachment structure in FIG. 2 are used for the same components.

Figure 5:
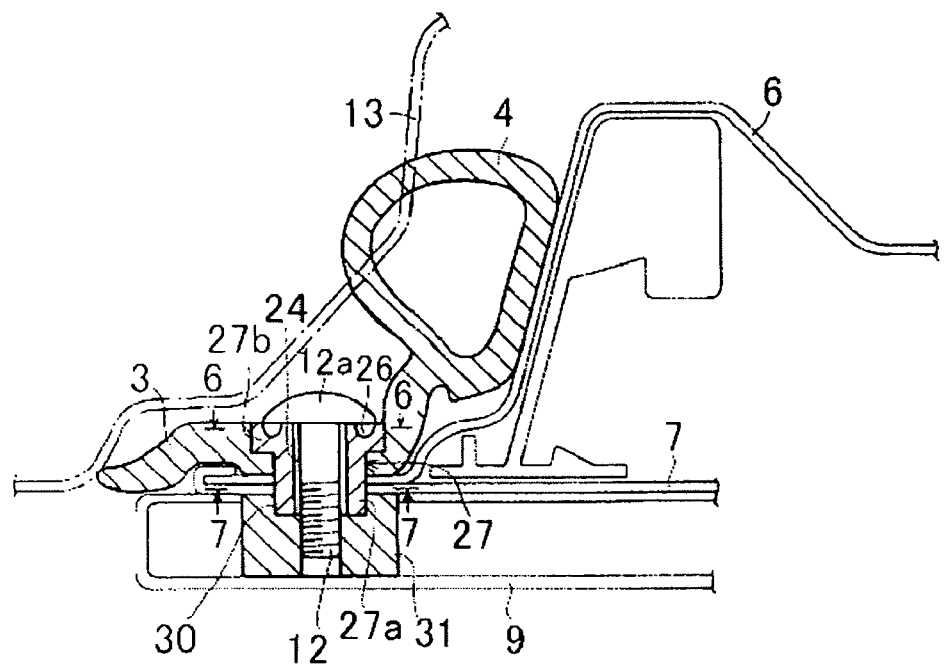
FIG. 5 is a cross-sectional view of the structure for attaching the molded part according to the present invention.
Figure 6:
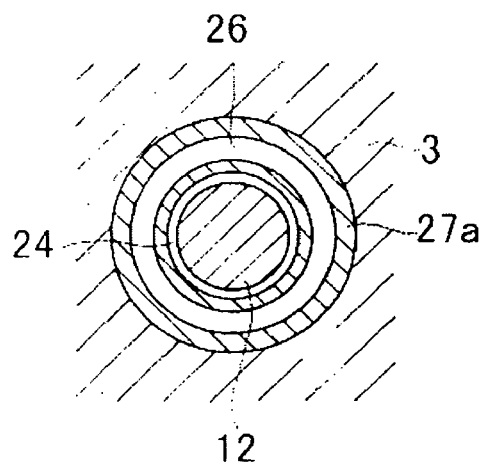
FIG. 6 is a cross-sectional view at the line 6-6 in FIG. 5.
Figure 7:
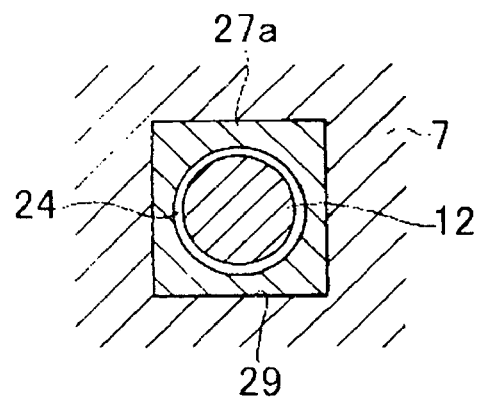
FIG. 7 is a cross-sectional view at the line 7-7 in FIG. 5.

FIG. 5 shows a structure for attaching the molded part at the position in FIG. 1. FIG. 6 is a cross-sectional view at the line 6-6 in FIG. 5 and FIG. 7 is a cross-sectional view at the line 7-7 in FIG. 5.

The molded part is made of, for example, ethylenepropylene, diene copolymer EPDM rubber, or thermoplastic elastomer like the extruded part, and comprises a base 3 that is attached to the overlapped portion of an inner door panel 6 and an outer door panel 7 and a sealing portion 4 that is integrally molded with the base 3 and makes elastic contact with a door opening edge of the body when the door is closed. The sealing portion 4 is hollow in the figure; however, it can have a lip.

The base 3 has an eyelet-shaped insert 27 integrally molded with it and made of a material having a lower frictional coefficient than the base 3 such as polylolefins including polypropylene and polyethylene and metals including steel. The insert 27 comprises a thick flange 27*b* that is flush with the base 3, a mounting hole 24 through which a locking screw 12 is inserted, a recess 26 formed in the top surface of the flange 27*b* around the mounting hole 24, and an insert bottom 27*a* protruding from the flange 27*b* downward in the figure and having a square cross-section.

The recess 26 can be an annular groove formed concentrically around the mounting hole, or one or multiple or a number of recesses formed around the mounting hole at equal intervals along the circumference. Among these, an annular groove is preferable because when a molded part having an insert having an annular groove is molded, the outer periphery of the recess prevents the molten molding material from flowing in the recess, ensuring a base having an annular groove around the mounting hole.

The insert bottom 27*a* is inserted in a nut 31 secured in an outside molding 9 at the belt line.

A hole 29 having the same square shape as the cross-section of the insert bottom 27*a* is formed in the inner and outer door panels 6 and 7 at the overlapped portion of FIG. 7. The insert bottom 27*a* having a square cross-section is inserted in the square hole 29 for anti-rotation. For anti-rotation, the insert bottom 27*a* and the engaging hole at the overlapped portion can have another cross-section such as a polygon other than a square, for example a polygon having three or more sides, a circle partly cut off at a chord, a shape having one or more recesses or protrusions.

A square cross-section groove 30 is formed in a nut 31 secured in the outside molding 9, for inserting the insert bottom 27*a* therein. A screw hole is formed at the bottom of the groove. When the base 3 of the molded part is attached to the overlapped portion of the inner and outer door panel 6 and 7, a locking screw 12 is screwed in the nut 31 through the insert 27 for locking.

The structure for attaching the molded part of this embodiment having the structure described above yields the following effects. The insert 27 is made of polypropylene having a low frictional coefficient and makes contact with the locking screw head 12*a* in a smaller area because of the recess 26, less frictional drag being produced when the locking screw 12 is screwed in and fastened. In addition, the insert bottom 27*a* having a square cross-section is fit into the square door panel hole 29 for anti-rotation, resolving the problem that the base 3 integrated with the insert 27 rotates together with the locking screw 12 and is twisted, which otherwise impairs the appearance. The recess in the form of an annular groove advantageously has a peripheral wall that prevents the molten molding material from flowing into the recess during the molding of the molded part. Therefore, the annular groove can be reliably formed around the mounting hole, effects which can be obtained simply by using the insert 27 in place of the insert 5 of the attachment structure shown in FIG. 2. The molded part can be easily attached to the door panel simply by screwing the locking screw 12.

What is claimed is:

1. A structure for attaching a molded part to a door panel, said molded part comprising a weather strip for vehicle door panels, said weather strip having a sealing portion providing sealing between the door and a body of a vehicle when the door is closed, and a base integrally molded with said sealing portion, wherein said base is secured to the door panel using a locking screw that is screwed in a member fixed to the door through a mounting hole formed in said base, and said base has an integrally molded insert defining said mounting hole and having a lower frictional coefficient than the base for inserting said locking screw, and wherein said insert has a recess in the position where a head of said screw makes contact when attached using said locking screw.

2. The structure for attaching the molded part according to claim 1, wherein said recess is an annular recess formed around the edge of said mounting hole.

3. The structure for attaching the molded part according to claim 2, wherein said insert protrudes on a side of said door panel, and has said mounting hole in which said locking screw is inserted and an anti-rotation means against said door panel at the circumference of a portion inserted in said door panel.

* * * * *